(12) United States Patent
Gelardi

(10) Patent No.: US 6,443,300 B1
(45) Date of Patent: Sep. 3, 2002

(54) MULTI-DISC PACKAGE WITH DISC-LOCKING STRAPS

(75) Inventor: John A. Gelardi, Kennebunkport, ME (US)

(73) Assignee: AGI Inc., New York, NY (US)

( * ) Notice: Subject to any disclaimer, the term of this patent is extended or adjusted under 35 U.S.C. 154(b) by 0 days.

(21) Appl. No.: 09/642,470

(22) Filed: Aug. 21, 2000

(51) Int. Cl.$^7$ ............................................. B65D 85/57
(52) U.S. Cl. ....................... 206/312; 206/308.1; 206/1.5
(58) Field of Search ............................. 206/307, 308.1, 206/309, 310, 311, 312, 318.2, 1.5, 493, 303, 450, 560, 565; 369/291

(56) References Cited

U.S. PATENT DOCUMENTS

| | | | |
|---|---|---|---|
| 5,263,580 A | * 11/1993 | Ciba et al. | .................. 206/309 |
| 5,695,053 A | * 12/1997 | Koh et al. | ................ 206/308.1 |
| 5,788,068 A |   8/1998 | Fraser et al. | |
| 5,791,467 A |   8/1998 | Mahone | |
| 5,799,782 A |   9/1998 | Gelardi | |
| 5,819,929 A | 10/1998 | Chung | |
| 5,881,870 A |   3/1999 | Nakahira et al. | |
| 5,887,714 A |   3/1999 | Yeo | |
| 5,899,327 A |   5/1999 | Sykes | |
| 5,906,274 A | *  5/1999 | McEwan | .................. 206/308.1 |
| 5,944,180 A | *  8/1999 | Koh et al. | ................ 206/308.1 |
| 5,988,375 A | * 11/1999 | Chang | ..................... 206/308.1 |
| 5,996,788 A | * 12/1999 | Belden, Jr. et al. | ......... 206/310 |

\* cited by examiner

Primary Examiner—Mickey Yu
Assistant Examiner—Jila M. Mohandesi
(74) Attorney, Agent, or Firm—James Creighton Wray; Meera P. Narasimhan

(57) ABSTRACT

A new DVD or CD package has thin disc-retaining straps which are vertically rigid and are bendable horizontally between bi-stable opposite curves. Opposite edges of discs are held by inward curved straps. A user flexes the straps outward into outer stable positions before removing the discs. Closing the cover of the box moves the straps to their inward curved stable positions. Ramps attached to the spine and to the outer edge of the cover push the straps inward. The ramps, or ribs, also prevent the straps from being pushed to an unlocked position when the case is closed. The straps are molded in inward, disc-holding positions through openings in the back of the tray. The straps are configured to hold one or more discs positioned in the cylindrical well of the tray, which is formed by four segmental curved walls. Finger wells extend between the segmental walls and through the base of the tray and are preferably located at 90° intervals to the straps to provide ease in removing the discs.

34 Claims, 7 Drawing Sheets

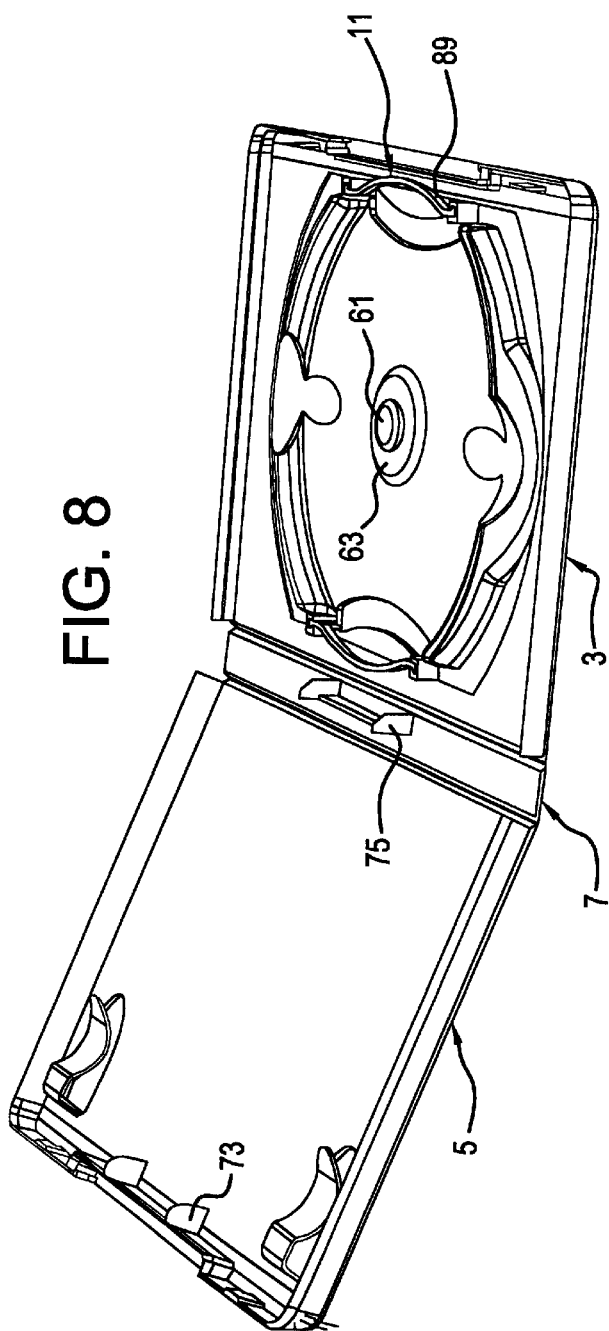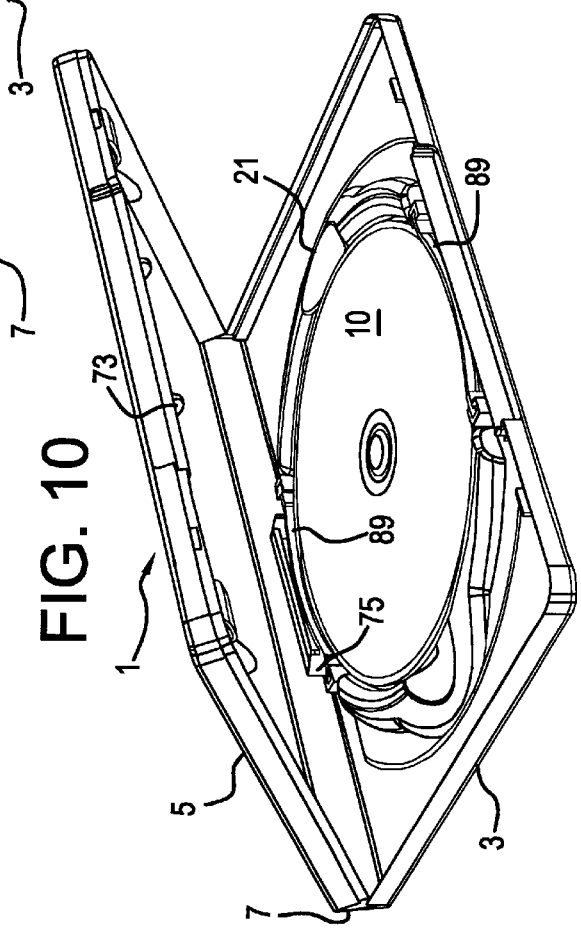

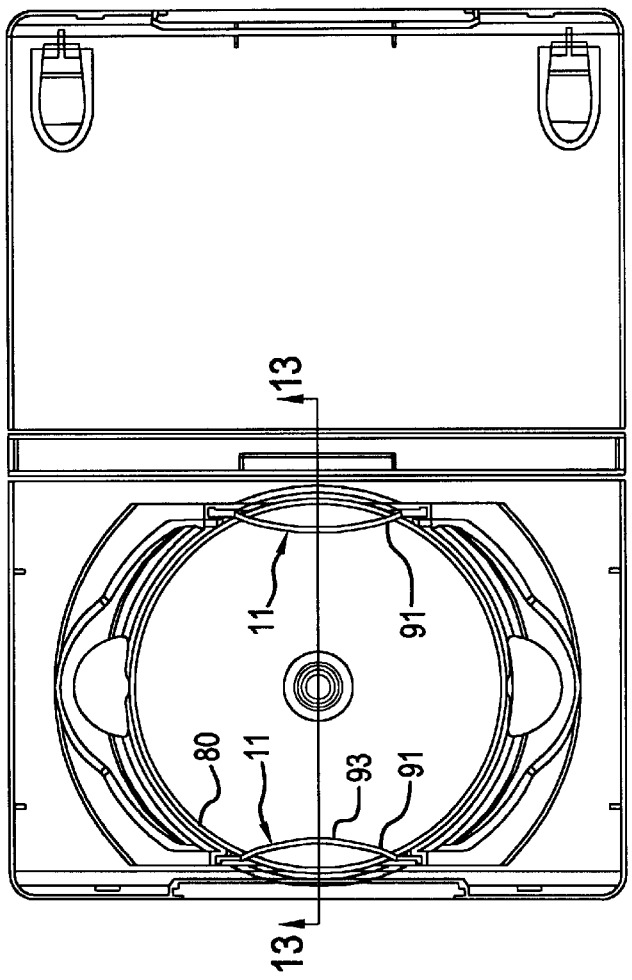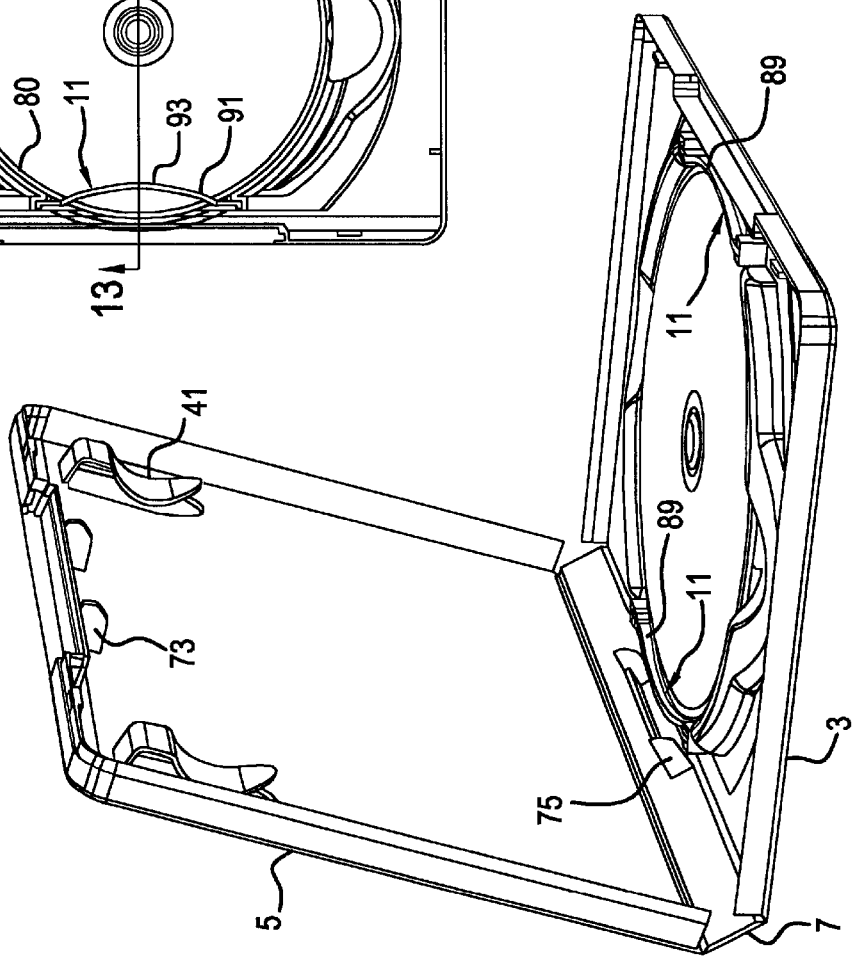

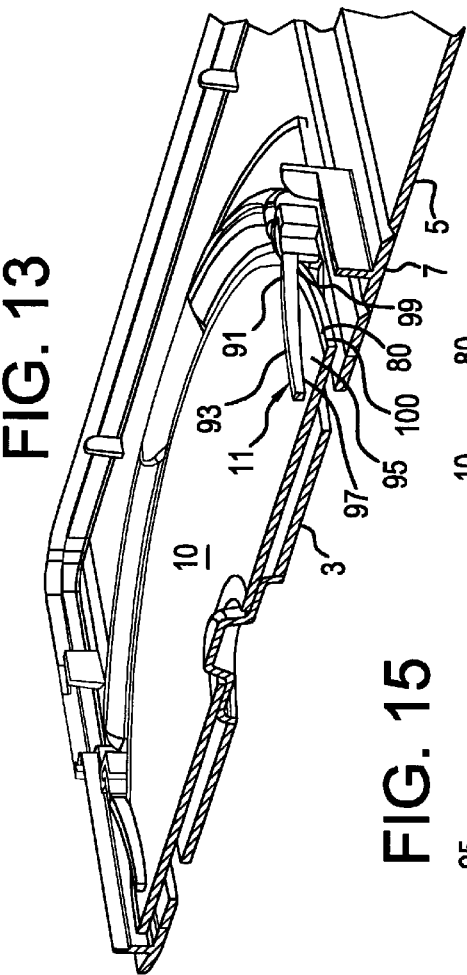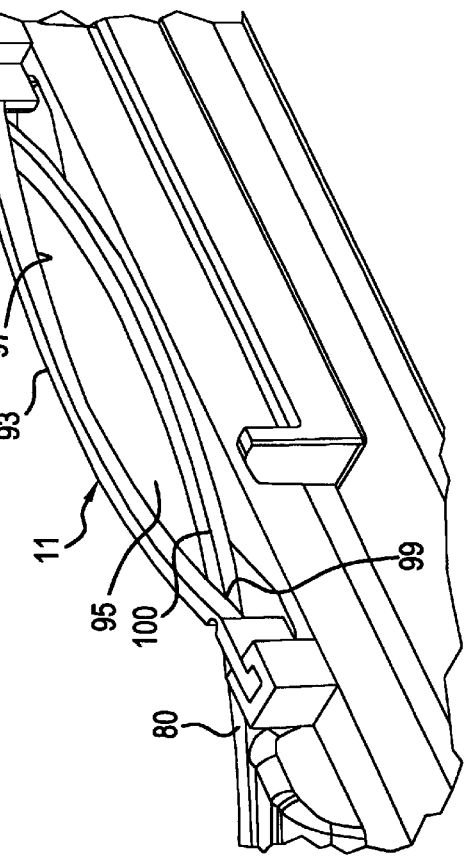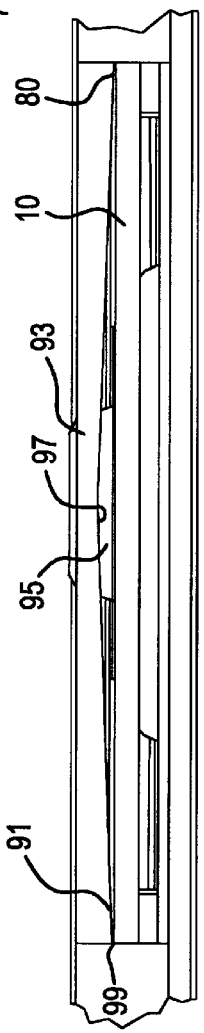

MULTI-DISC PACKAGE WITH DISC-LOCKING STRAPS

BACKGROUND OF THE INVENTION

Compact discs and DVD's are packaged in a variety of packages such as jewel boxes and cardboard sleeves. When the discs are packaged in boxes with hinged covers, rosettes are often used at their centers to prevent unwanted dislodgement. Strong rosettes are provided to prevent dislodgement of discs during rough handling, such as for example in shipping or unintentional dropping of the packages. Strong rosettes cause difficulty in removing the discs. Removal of discs from any rosette requires dexterity and caution not to bend the discs and not damage their openings. Concerns of possible undetected theft of discs from apparently unopened cases should be addressed. Holding multiple discs presents problems to rosette design.

Needs exist for improved methods of holding discs in packages.

SUMMARY OF THE INVENTION

A new DVD or CD package has thin disc-retaining straps which are vertically rigid and are bendable horizontally between bi-stable opposite curves. Opposite edges of discs are held by inward curved straps. A user flexes the straps outward into outer stable positions before removing the discs. Closing the cover of the box moves the straps to their inwardly curved stable positions. Ramps attached to the spine and to the outer edge of the cover push the straps inward. The ramps, or ribs, also prevent the straps from being pushed to an unlocked position when the case is closed. The straps are configured to hold one or more discs positioned in the cylindrical well of the tray, which is formed by four segmental curved walls. Finger wells extend between the segmental walls and to or through the base of the tray and are preferably located at 90° intervals to the straps to provide ease in removing the discs.

The straps are molded in inward, disc-holding positions through openings in the back of the tray. As an alternative to molding the straps with the tray, ends or preformed straps are pressed into sockets provided on bosses in the trays.

Bosses which hold ends of the straps are spaced apart less than a length of the strap so that the strap is always curved. While the straps are being moved between stable locking and releasing positions, compound curvatures may be created in the straps. The straps have minor cross-sectional dimensions parallel to the discs and major cross-sectional dimensions perpendicular to the discs.

The trays do not require rosettes, but may have rosettes for engaging the centers of the discs. The tray, spine and cover are preferably molded as one part, with the spine connected by parallel living hinges to the cover and tray.

A preferred disc case apparatus has a base and a spine connected to the base. A cover is connected to the spine. A disc well in the base receives one or more discs. Disc-locking straps are connected to the base, are extendable over peripheral portions of the disc well in disc-locking positions, and are movable into disc-releasing positions outside of the disc well.

The disc well has raised sides, and the straps are connected to the base near the raised sides. Each strap has opposite ends, and the ends of the straps are mounted in the base near the disc walls. Preferably bosses are connected to the base, and the ends of the straps are connected to the bosses.

In one form, the bosses and straps are integrally formed with the base.

In another form, the bosses have openings for receiving the ends of the straps. The ends of the straps are secured in the openings in the bosses by pressed interference fitting, welding or bonding.

The straps are flexible, and the straps form inwardly curved locking positions over the disc wells and form outwardly curved disc-releasing positions. The straps curved or are angled in vertical directions so that only portions of the straps near the bosses engage outer peripheral areas of the disc. The middle portions of the straps are raised above the discs, so that they do not contact data holding portions of the discs.

The straps are relatively thin and relatively wide, and thin dimensions of the straps are oriented parallel to the base.

The spine is hinged to the base, and ribs are connected to the spine and to an edge of the cover remote from the spine for engaging the straps and moving the straps from the disc-releasing positions to the disc-locking positions as the cover is closed.

The ribs extend over the base when the cover is closed for holding the straps inward in the disc-locking position.

A disc well is formed in the base with segmental arcuate wall sections, each of the arcuate segmental sections having a first end and a second end. Ends of the straps are connected to the base at first ends of the segmental sections, and finger wells are formed in the base at second ends of the segmental sections.

A base rim is connected to the three edges of the base which are not connected to the spine. The base rim has a relatively thick portion connected to the base and a relatively thin portion extending outward from the relatively thick portion. The cover has a cover rim extending around three edges of the cover not connected to the spine. The cover rim has a relatively thick portion connected to the cover and a relatively thin portion extending from the relatively thick portion. The relatively thin portion of the base rim and the relatively thin portion of the cover rim overlie each other when the cover is closed. The relatively thick portion of the base rim and the relatively thick portion of the cover rim abut outer edges respectively of the thin portions of the cover and base rims when the cover is closed. The base rim has first cooperating male snaps, and the cover rim has second cooperating female snaps for engaging the first cooperating snaps and holding the cover closed.

A button in the center of the base receives central openings in the disc. A raised annular platform formed in the base around the button lifts the discs. Height of the annular platform is controlled according to the number of discs to be packaged in a single container. Segmental disc well walls are formed upward from the base, and are spaced oppositely for receiving the straps. Finger well openings extend through the walls and to or through the base for allowing disc removal.

Strap-forming openings in the base permit forming the straps with the base.

One preferred disc package apparatus has a tray for holding one or more discs. A thin strap is connected to the tray, and is movable into a disc-holding position. Portions of the strap overlie outer peripheral portions of the discs, and the strap is movable to a disc-releasing position.

The strap has first and second ends which are connected to the tray at positions closer to each other than a length of the strap. The strap is forced over-the-center into first and second oppositely curved stable conditions, the first stable condition comprising the disc-holding position, and the second stable condition the disc-releasing position.

A second strap has ends connected to the tray opposite the first strap, and is movable between a disc-holding position and a disc-releasing position.

A preferred method of handling discs comprises opening a disc-holding case and moving flexible straps from an inward disc-locking position to an outward disc-releasing position. The discs are removed and later replaced, and the straps are returned to the inward disc-locking positions.

Movable portions of the case are closed, and the straps are contacted in their outward disc-releasing positions with ribs on the movable portions of the case as the case is being closed. The straps are pushed inward to their inward disc-locking position with the ribs as the movable portions of the case are being closed. The ribs hold the straps inward, locking the discs, while the cover is closed.

These and further and other objects and features of the invention are apparent in the disclosure, which includes the above and ongoing written specification, with the claims and the drawings.

BRIEF DESCRIPTION OF THE DRAWINGS

FIG. 8 is a side perspective view of a case before a DVD or CD is inserted.

FIG. 10 is a perspective view showing the case being further closed, with ribs on the spine contacting the disc-locking clamp.

FIG. 11 is a side perspective view showing the ribs on the spine and cover, which engage and press the straps inward to the disc-locking positions as the cover is being closed, and which hold the straps inward after the cover has been closed.

FIG. 12 is a plan view of the disc package showing contact areas of the straps with the peripheral areas of the disc.

FIG. 13 is a sectional detail of the disc package showing the curvature of the straps taken along line 13 of FIG. 12.

FIG. 14 is a detail of a strap in the disc-locked position, showing the curvature of the strap and the contact of end portions of the strap with peripheral areas on the upper disc.

FIG. 15 is a detail of the package showing the curvature of the strap.

DETAILED DESCRIPTION OF THE PREFERRED EMBODIMENTS

Figure 1:
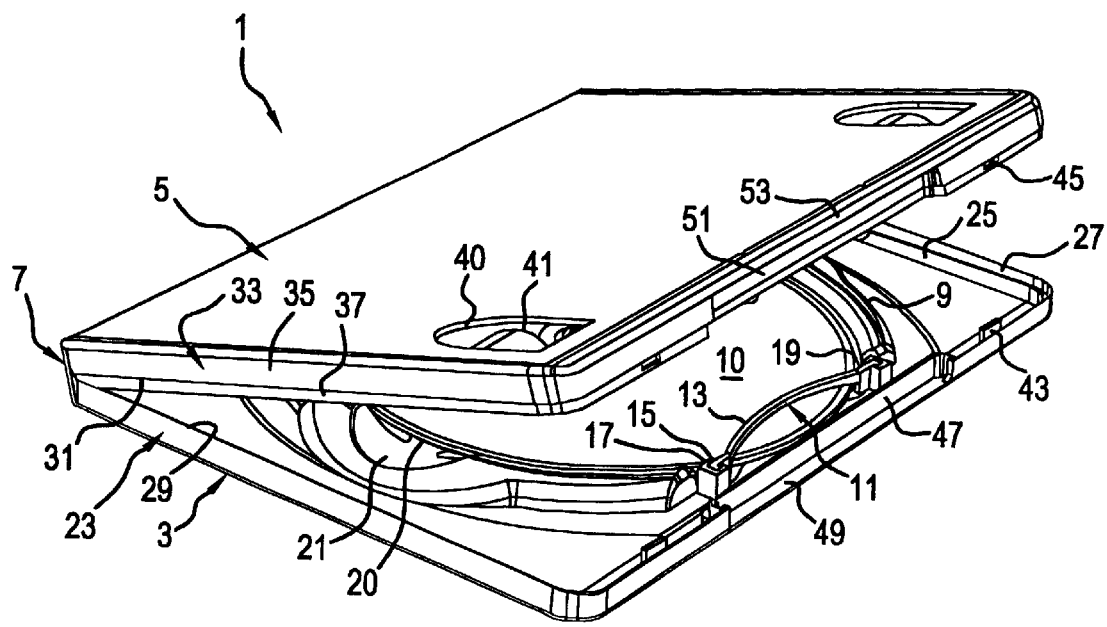
FIG. 1 is a perspective view of an open disc case with the strap-locking system of the present invention.

Referring to FIG. 1, a disc case is generally indicated by the numeral 1. The case has a base 3, a cover 5 and a spine 7, which interconnects the base and cover. The base has a disc well 9 formed therein from segmental arcuate sections of a generally cylindrical structure. One or more discs 10 are received in the well. A strap 11, shown in its inward disc-locking position 13, has ends 15 which are connected to the base. The connections are provided by bosses 17 having openings 19 for tightly receiving the strap ends 15, which are pressed into the openings 19.

Alternatively, the strap 13 and the bosses 17 may be integrally formed with the case.

Finger well openings 21 are provided oppositely in the disc well 9 and in the base 1 for removing the discs. A second disc 20 is shown under the top disc 10. Base rims 23 surround three edges of the base. The base rim has a thick bottom portion 25 and a thin upper portion 27 with an upper edge 29, which abuts surface 31 of the enlarged base 33 of cover rim 35. A thin extension 37 on the cover rim 35 fits within the thin upper portion 27 of the base rim. Edge 39 abuts the upper surface of the thick base rim portion 25. Cover 5 has openings 40 through which the book-retaining tabs 41 are formed. Male snap projections 43 cooperates with female snaps 45 on the cover to hold the cover closed. A front portion 47 of the base is recessed to form shelf 49, which aid the opening of the case. A similar recess 51 and shelf 53 are formed in the cover.

Figure 2:
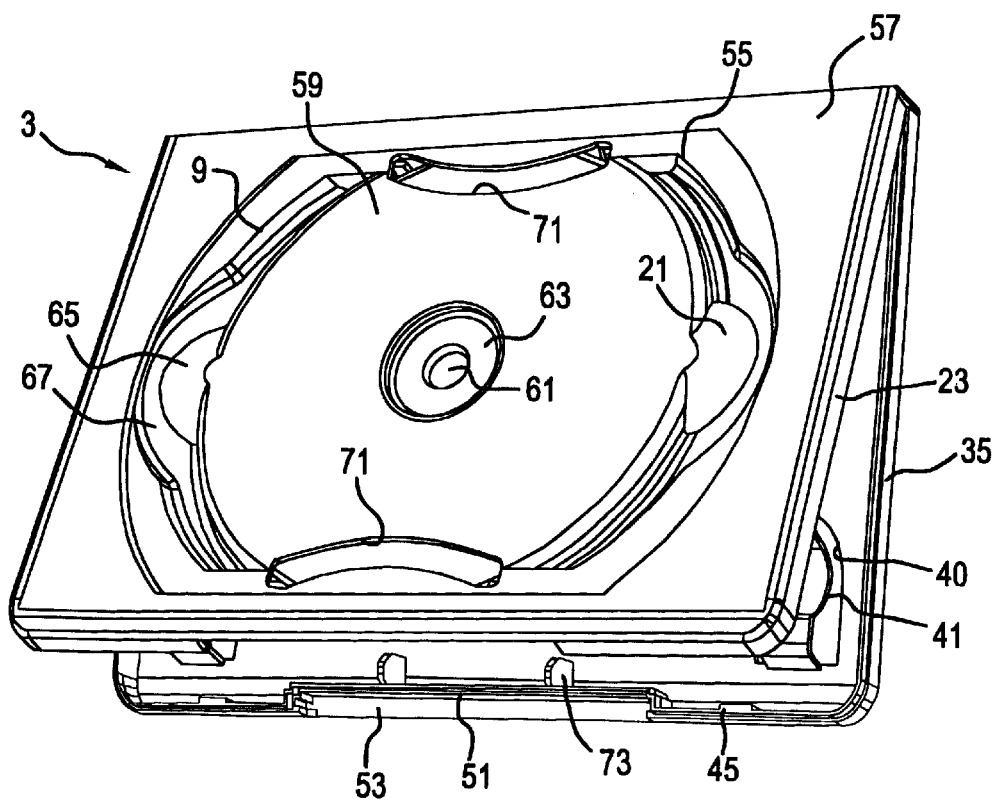
FIG. 2 is a bottom perspective view of the disc case shown in FIG. 1.

FIG. 2 shows a bottom view of the base 3 in which the well 9 is formed with walls 55, having a thickness similar to the thickness of the major wall 57 of the base. The segmental walls 55 extend around a central base wall area 59. A central button 61 fits through openings of the center of the disc, and a platform 63 underlies the central portion of the disc. The height of the platform 63 may be determined according to the number of the discs to be held in the well 9.

The finger well openings 21 extend through the base. Alternatively, the finger wells may be formed with bottom walls 65. Side walls 67 of the finger wells extend outward. Openings 71 are formed in the central wall portion 59 of the base to allow integral molding of the hold-down straps 11 in their inward disc-locking positions 13. Ribs 73 are formed in the cover for moving the strap inwardly to the disc-locking position as the cover is closed. The ribs 73 also reinforce the recessed area 51 of the front wall of the cover rim 35.

Figure 3:
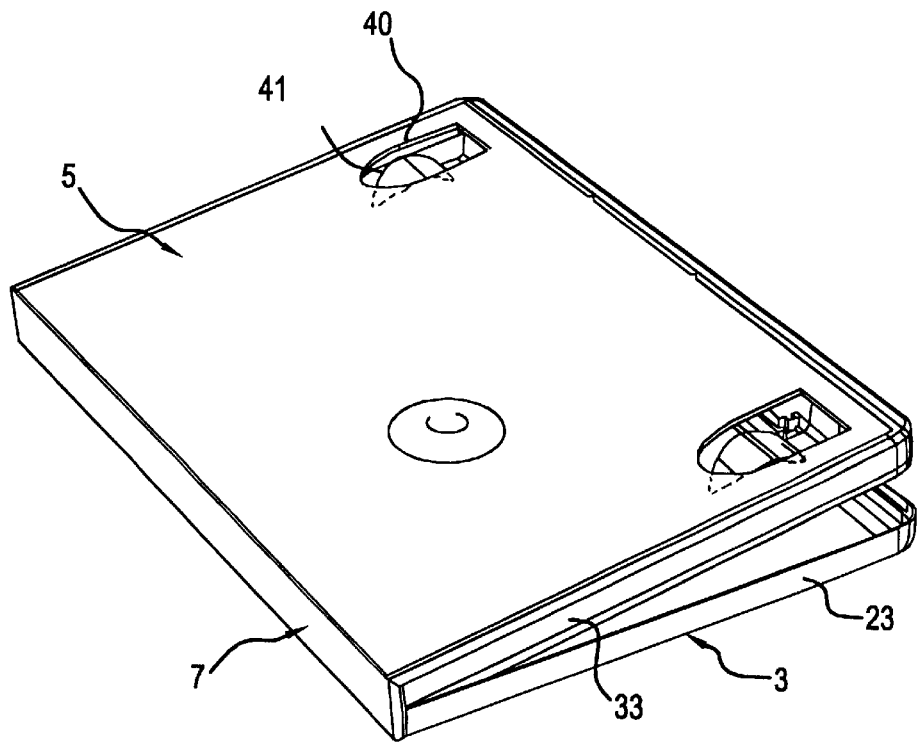
FIG. 3 is a bottom perspective view of an open disc case with the strap-locking system of the present invention.

FIG. 3 shows a top view of the cover.

Figure 4:
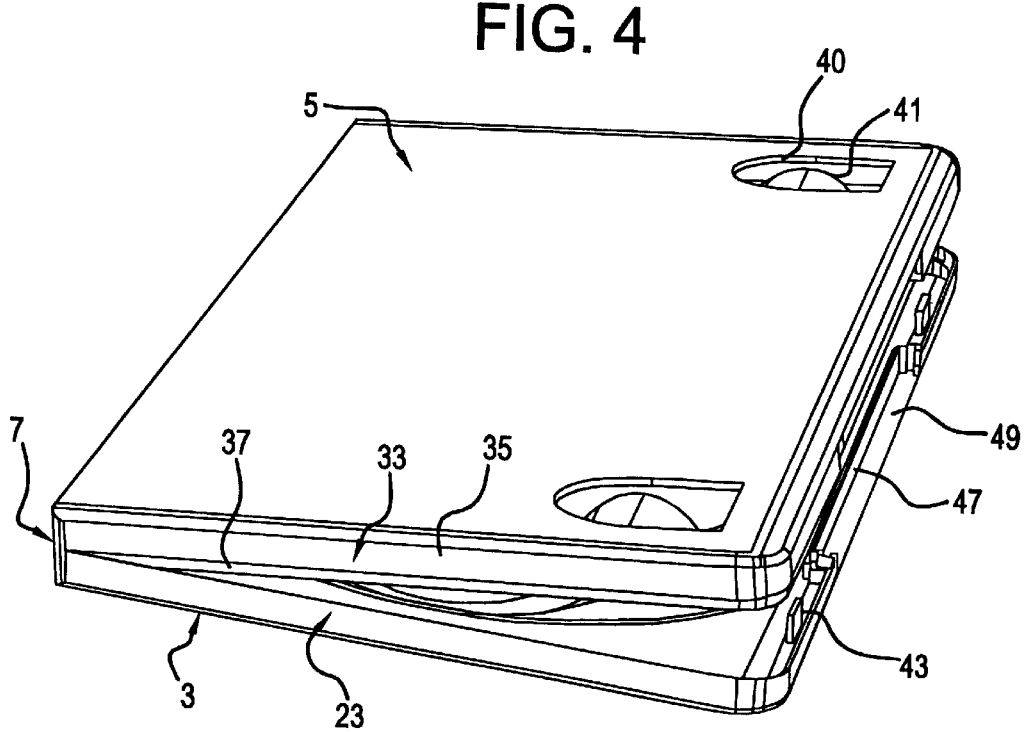
FIG. 4 is a side perspective view of the disc case shown in FIG. 1.

FIG. 4 shows a side view of the case.

Figure 5:
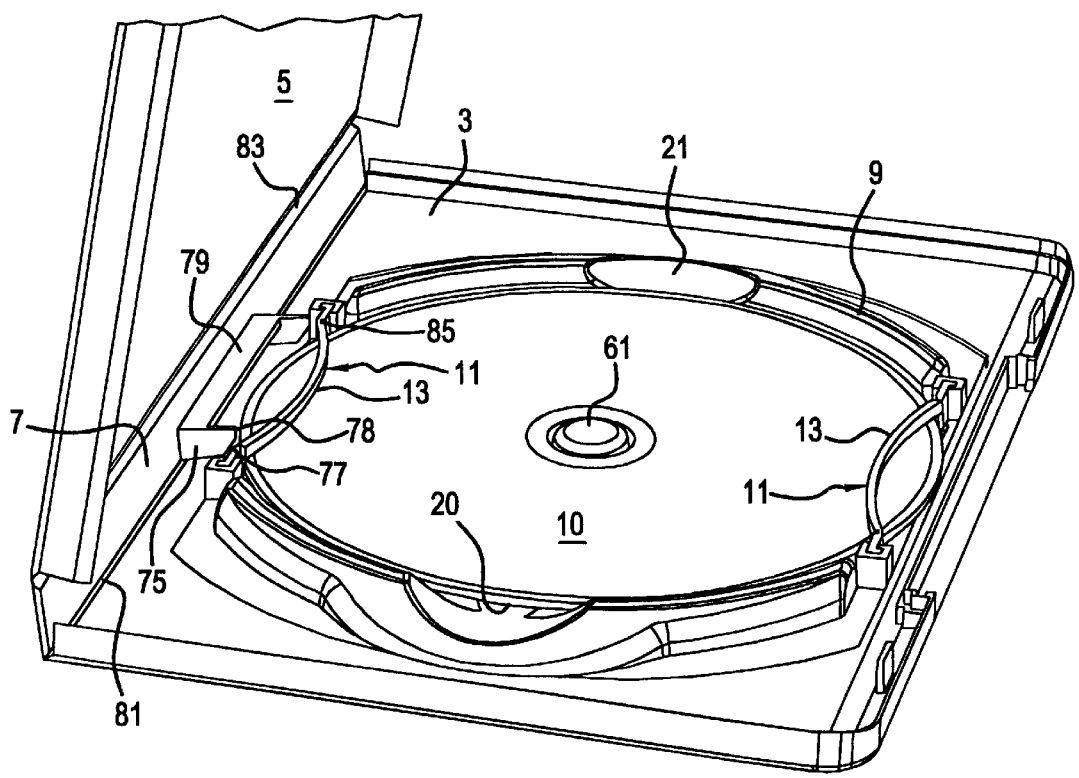
FIG. 5 is a perspective view of the base holding a disc and showing the straps in the disc-locking position.

FIG. 5 shows a second disc-retaining strap 11 in the inward disc-locking position 13. Ribs 75 are molded on the inner surface of spine 7 to move the strap 11 to the locked position 13 when the cover and spine are closed. Ramps 77 on the ribs first engage the strap 11 and push the strap inward as the spine 7 is brought up into position. Ends 78 bear against the strap 11 when the spine 7 is closed, holding the strap 11 in the inward locked position 13. The molded shelf 79 supports and rigidifies the ribs 75.

As shown in FIG. 5, the spine 7 is joined to the base 3 by living hinge 81. Living hinge 83 joins the spine 7 to the cover 5. Ends of the straps 11 have living hinges 85, which facilitate the bending of the straps. The straps 11 operate as over-the-center mechanisms, so that as soon as the strap is urged beyond an imaginary line connecting the ends 15, the strap snaps into one of its two stable positions. A simple center disc button 61 centers the discs, and has no locking means in a typical configuration. The center button may be made with a rosette.

Figure 6:
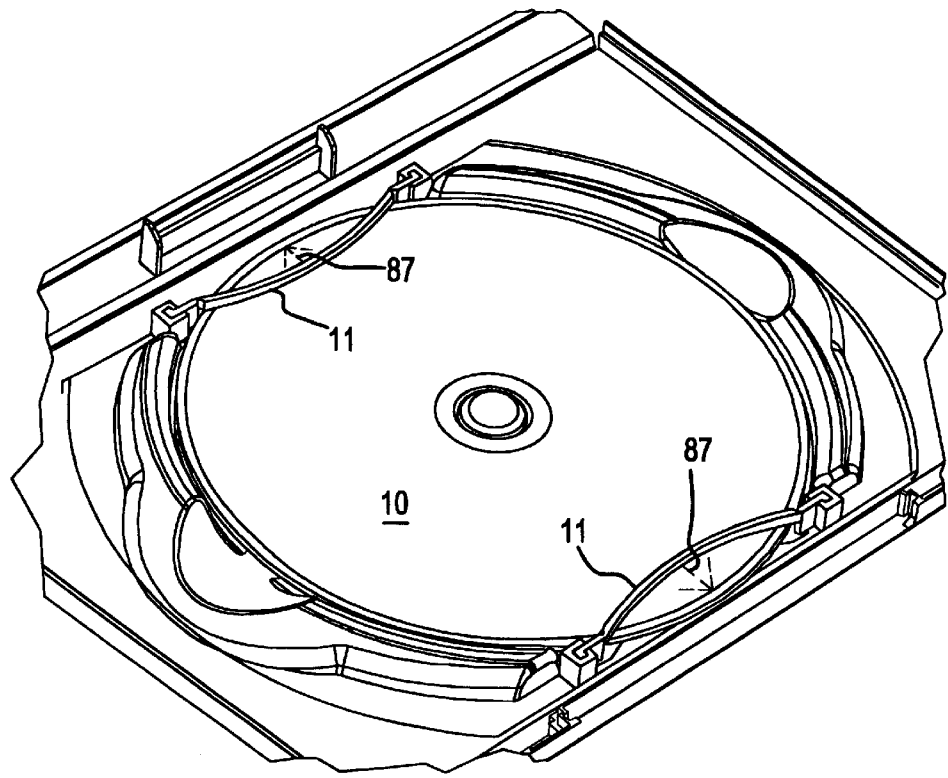
FIG. 6 is a perspective view of the base holding a disc and showing the straps in the disc-locking position, with arrows showing the direction of movement of the straps to the unlocked disc-removing position.

As shown in FIG. 6, after opening the case 1 the user pushes the straps 11 outward in the direction of arrows 87 to release the discs. The outer disc releasing position 89 is shown in FIGS. 7 and 8.

Figure 7:
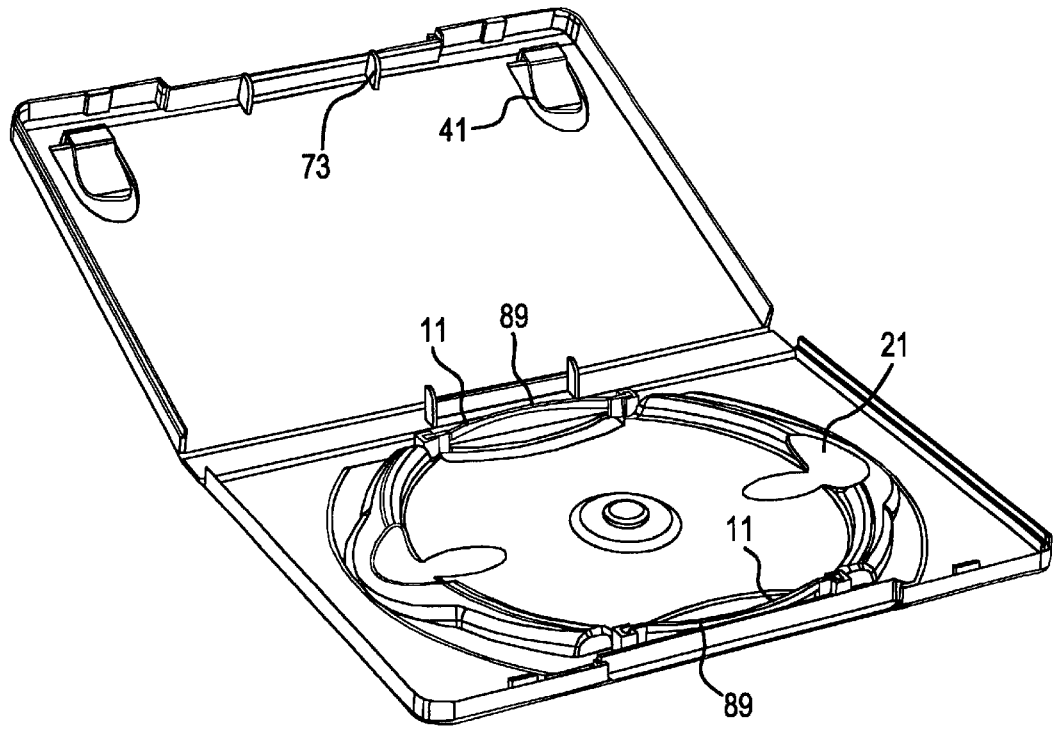
FIG. 7 is a front perspective open view of the case from which a disc or discs have been removed.

Ribs 75 shown in FIG. 7 engage and move the strap 11 near the spine when the cover is closed. Ribs 73 along the outer edge of the cover engage and move the strap 11 into disc-locking position. A hook insert is placed under the retaining tabs 41 on the cover.

It is important to note that the ribs 73 and 75 cooperate in holding the straps 11 in the locked position. The case has to be fully opened to allow the locking straps 11 to move to the unlocked position 89, as shown in FIG. 7. The requirement to fully open the case before the locking straps 11 may be moved away from the locked position deters theft of discs from the case and prevents the discs from coming out of the case until the case is opened fully and the straps are intentionally moved. Before the case is fully opened, the ribs 73 on the cover 5 and the ribs 75 on the spine 7 prevent moving the front and rear straps into the unlocked positions.

FIG. 8 shows the open position of the case with the straps in the unlocked position and the disc removed.

Figure 9:
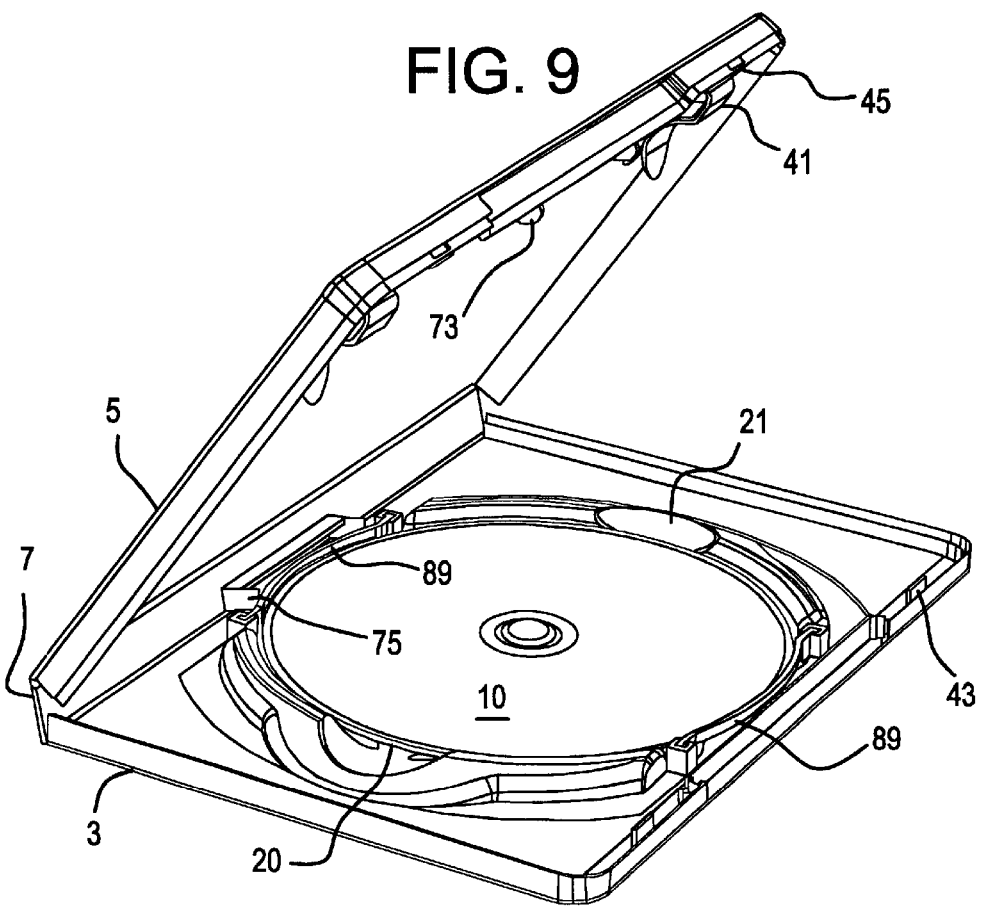
FIG. 9 is a perspective view showing the case after the disc has been inserted and while the case is being closed.

FIG. 9 shows the discs replaced in the well 9, and the ribs 75 about to engage and move the rear strap 11 into position over the disc. Completing the closing of the cover causes the ribs 73 to move the front strap 11 from the disc-release position 89 to the inward disc-locking position.

FIGS. 10 and 11 show packages with discs inserted and the straps in-the unlocked position.

As shown in FIG. 12 the straps 11 in the locked position contact the disc 10 only in the outer edge areas 80 which do not contain digital information. Outer portions 91 of the straps 11 contact the peripheral area 80 of the upper disc and hold the discs in the package. The central portion 93 of the straps 11 leaves an air gap 95 between the disc and lower strap surface as shown in FIG. 13. The lower surfaces 97 of the straps preferably are arced and curved up in a way from the discs. Alternatively, the lower surfaces may be angular. By contacting only the peripheral portions 80 of the disc 10 the straps 11 may be moved to the unlocked position, the disc or discs may be removed and used and returned to the package and the package may be closed, moving the straps 11 into a locking position repeatedly without damage to the central data bearing areas of the discs.

FIG. 14 shows a detail of the contact areas 99 at the ends 91 of strap 11. There it is seen that the curved strap contacts only the outer edge 100 of the peripheral area 80 of disc 10.

FIG. 15 is an enlarged detail showing the contact 91 only at the outer edge 100 of the disc 10. Contacting the discs only at the outer edges ensures an air gap between the straps and the discs when the strap is in the lock position. The majority of the bottom of the strap does not contact the top of the disc and thereby prevents scuffing, scratching, marking or marring the disc area that is used for data. The top surface of the strap may be flat or curved to the same or a lesser degree compared to the bottom surface of the strap.

In the specification, tray and base may be considered as synonymous. Alternatively, a tray may be molded for insertion in a separate flat base.

While the invention has been described with reference to specific embodiments, modifications and variations of the invention may be constructed without departing from the scope of the invention, which is defined in the following claims.

I claim:

1. Disc case apparatus, comprising a base, a spine connected to the base, a cover connected to the spine, a disc well in the base for receiving one or more discs, and disc-locking straps connected to the base and extendable over peripheral portions of the one or more discs in the disc well in disc-locking positions holding the one or more discs in the well and movable into disc-releasing positions.

2. The apparatus of claim 1, wherein the disc well has raised sides, and wherein the straps are connected to the base near the raised sides.

3. The apparatus of claim 1, wherein the straps are flexible, and wherein the straps form inwardly curved locking positions over the disc well and form outwardly curved disc-releasing positions.

4. The apparatus of claim 3, wherein the straps are relatively thin and relatively wide, and wherein thin dimensions of the straps are oriented parallel to the base.

5. The apparatus of claim 1, further comprising strap-forming openings in the base for forming the straps with the base.

6. Disc case apparatus, comprising a base, a spine connected to the base, a cover connected to the spine, a disc well in the base for receiving one or more discs, and disc-locking straps connected to the base and extendable over peripheral portions of the disc well in disc-locking positions and movable into disc-releasing positions, wherein the disc well has raised sides, and wherein the straps are connected to the base near the raised sides, wherein each strap has opposite ends, and wherein the ends of the straps are mounted in the base near the disc well raised sides, wherein the straps have lower surfaces with raised central portions and have end portions near the ends of the straps for contacting disc surfaces only with the end portions and spacing the central portions from surfaces of a disc and the well.

7. The apparatus of claim 6, further comprising bosses connected to the base, and wherein the ends of the straps are connected to the bosses, wherein the lower surfaces of the straps are curved and the end portions of the lower surfaces contact the peripheral edges of a disc in the well when the straps are in the disc-locking positions and wherein an air gap is formed between the central portion of the lower surface and the disc when the straps are in disc-locking positions.

8. The apparatus of claim 7, wherein the bosses and straps are integrally formed with the base.

9. The apparatus of claim 7, wherein the bosses have openings for receiving the ends of the straps, and wherein the ends of the straps are secured in the openings in the bosses.

10. Disc case apparatus, comprising a base, a spine connected to the base, a cover connected to the spine, a disc well in the base for receiving one or more discs, and disc-locking straps connected to the base and extendable over peripheral portions of the disc well in disc-locking positions and movable into disc-releasing positions, wherein the straps are flexible, and wherein the straps form inwardly curved locking positions over the disc well and form outwardly curved disc-releasing positions, wherein the straps are relatively thin and relatively wide, and wherein thin dimensions of the straps are oriented parallel to the base, wherein the spine is hinged to the base, and further comprising ribs connected to the spine and ribs connected to an edge of the cover remote from the spine for engaging the straps with the ribs and moving the straps with the ribs from the disc-releasing positions to the disc-locking positions as the cover is closed.

11. The apparatus of claim 10, wherein the ribs extend over the base when the cover is closed for holding the straps inward in the disc-locking positions.

12. Disc case apparatus, comprising a base, a spine connected to the base, a cover connected to the spine, a disc well in the base for receiving one or more discs, and disc-locking straps connected to the base and extendable over peripheral portions of the disc well in disc-locking positions and movable into disc-releasing positions, further comprising a disc well formed in the base having segmental arcuate wall sections, each of the arcuate segmental sections having a first end and a second end, and wherein ends of the straps are connected to the base at first ends of the segmental sections and finger wells are formed in the base at second ends of the segmental sections.

13. Disc case apparatus, comprising a base, a spine connected to the base, a cover connected to the spine, a disc well in the base for receiving one or more discs, and disc-locking straps connected to the base and extendable over peripheral portions of the disc well in disc-locking positions and movable into disc-releasing positions, further comprising a base rim connected to edges of the base which are not connected to the spine, the base rim having a relatively thick portion connected to the base and a relatively thin portion extending outward from the relatively thick portion, the cover having a cover rim extending around edges of the cover not connected to the spine, the cover rim having a relatively thick portion connected to the cover and a relatively thin portion extending from the relatively thick portion, the relatively thin portion of the base rim and the relatively thin portion of the cover rim overlying each other when the cover is closed, and the relatively thick portion of the base rim and the relatively thick portion of the cover rim abutting outer edges respectively of the thin portions of the cover and base rims when the cover is closed, and the base rim having first cooperating snaps and the cover rim having second cooperating snaps for engaging the first cooperating snaps and holding the cover closed.

14. Disc case apparatus, comprising a base, a spine connected to the base, a cover connected to the spine, a disc well in the base for receiving one or more discs, and disc-locking straps connected to the base and extendable over peripheral portions of the disc well in disc-locking positions and movable into disc-releasing positions, further comprising a button in the center of the base for receiving central openings in the disc, and a raised portion formed in the base around the button for lifting the discs, segmental disc well walls formed upward from the base, the segmental walls being spaced oppositely for receiving the straps, and finger well openings extending through the walls and to or through the base for allowing disc removal.

15. Disc package apparatus, comprising a tray for holding one or more discs, a thin strap connected to the tray, the strap being movable into a disc-holding position, wherein portions of the strap overlie outer peripheral portions of the discs holding the one or more discs in the tray, the strap being movable to a disc-releasing position.

16. The apparatus of claim 15, wherein the strap has first and second ends which are connected to the tray at positions closer to each other than a length of the strap, wherein the strap is forced into first and second oppositely curved stable conditions, the first stable condition comprising the disc-holding position, and the second stable condition the disc-releasing position.

17. The apparatus of claim 16, further comprising a second strap having ends connected to the tray opposite the first strap, the second strap being movable between a disc-holding position and a disc-releasing position.

18. The apparatus of claim 15, wherein the straps are flexible, and wherein the straps form inwardly curved locking positions over the disc wells and form outwardly curved disc-releasing positions.

19. The apparatus of claim 18, wherein the straps are relatively thin and relatively wide, and wherein thin dimensions of the straps are oriented parallel to the base.

20. The apparatus of claim 15, further comprising strap-forming openings in the tray for forming the straps with the tray.

21. Disc package apparatus, comprising a tray for holding one or more discs, a thin strap connected to the tray, the strap being movable into a disc-holding position, wherein portions of the strap overlie outer peripheral portions of the discs, the strap being movable to a disc-releasing position, wherein the disc well has raised sides, and wherein the straps are connected to the tray near the raised sides.

22. The apparatus of claim 21, wherein each strap has opposite ends, and wherein the ends of the straps are mounted in the base near the disc walls, wherein the straps have lower surfaces with raised central portions and have end portions near the ends of the straps for contacting disc surfaces only with the end portions and spacing the central portions from surfaces of a disc and the well.

23. The apparatus of claim 22, further comprising bosses connected to the base, and wherein the ends of the straps are connected to the bosses, wherein the lower surfaces of the straps are curved and the end portions of the lower surfaces contact the peripheral edges of a disc in the well when the straps are in the disc-locking positions and wherein an air gap is formed between the central portion of the lower surface and the disc when the straps are in disc-locking positions.

24. The apparatus of claim 23, wherein the bosses and straps are integrally formed with the tray.

25. The apparatus of claim 23, wherein the bosses have openings for receiving the ends of the straps, and wherein the ends of the straps are secured in the openings in the bosses.

26. Disc package apparatus, comprising a tray for holding one or more discs, a thin strap connected to the tray, the strap being movable into a disc-holding position, wherein portions of the strap overlie outer peripheral portions of the discs, the strap being movable to a disc-releasing position, wherein the straps are flexible, and wherein the straps form inwardly curved locking positions over the disc wells and form outwardly curved disc-releasing positions, wherein the straps are relatively thin and relatively wide, and wherein thin dimensions of the straps are oriented parallel to the base, further comprising a spine hinged to the tray and a cover connected to the spine, and further comprising ribs connected to the spine and ribs connected to an edge of the cover remote from the spine for engaging the straps and moving the straps from the disc-releasing positions to the disc-locking positions as the cover is closed.

27. The apparatus of claim 26, wherein the ribs extend over the tray when the cover is closed for holding the straps inward in the disc-locking position.

28. Disc package apparatus, comprising a tray for holding one or more discs, a thin strap connected to the tray, the strap being movable into a disc-holding position, wherein portions of the strap overlie outer peripheral portions of the discs, the strap being movable to a disc-releasing position, further comprising a disc well formed in the tray having segmental arcuate wall sections, each of the segmental arcuate sections having a first end and a second end, and wherein ends of the straps are connected to the base at first ends of the segmental sections and finger wells are formed in the base at second ends of the segmental sections.

29. Disc package apparatus, comprising a tray for holding one or more discs, a thin strap connected to the tray, the strap being movable into a disc-holding position, wherein portions of the strap overlie outer peripheral portions of the discs, the strap being movable to a disc-releasing position, wherein the straps are flexible, and wherein the straps form inwardly curved locking positions over the disc wells and form outwardly curved disc-releasing positions, wherein the straps are relatively thin and relatively wide, and wherein thin dimensions of the straps are oriented parallel to the base, wherein the tray comprises a base, further comprising a base rim connected to edges of the base which are not connected to the spine, the base rim having a relatively thick portion connected to the base and a relatively thin portion extending outward from the relatively thick portion, the cover having a cover rim extending around edges of the cover not connected to the spine, the cover rim having a relatively thick portion connected to the cover and a relatively thin portion extending from the relatively thick portion, the relatively thin portion of the base rim and the relatively thin portion of the cover rim overlying each other when the cover is closed, and the relatively thick portion of the base rim and the relatively thick portion of the cover rim abutting outer edges respectively of the thin portions of the cover and base rims when the cover is closed, and the base rim having first cooperating snaps and the cover rim having second cooperating snaps for engaging the first cooperating snaps and holding the cover closed.

30. Disc package apparatus, comprising a tray for holding one or more discs, a thin strap connected to the tray, the strap being movable into a disc-holding position, wherein portions of the strap overlie outer peripheral portions of the discs, the strap being movable to a disc-releasing position, further comprising a button in the center of the base for receiving central openings in the disc, and a raised portion formed in the base around the button for lifting the discs, segmental disc well walls formed upward from the base, the segmental walls being spaced oppositely for receiving the straps, and finger well openings extending through the walls and to or through the tray for allowing disc removal.

31. The method of handling discs, comprising opening a disc-holding case, moving flexible straps from an inward disc-locking position to an outward disc-releasing position, removing discs, replacing discs, and returning the straps to the inward disc-locking positions and holding discs in the case with the straps.

32. A method of handling discs, comprising opening a disc-holding case, moving flexible straps from an inward disc-locking position to an outward disc-releasing position, removing discs, replacing discs, and returning the straps to the inward disc-locking positions, further comprising closing movable portions of the case and contacting the straps in the outward disc-releasing position, with ribs on the movable portions of the case as the case is being closed, and pushing the straps inward to the inward disc-locking position with the ribs as the movable portions of the case are being closed.

33. A method of handling discs, comprising opening a disc-holding case, moving flexible straps from an inward disc-locking position to an outward disc-releasing position, removing discs, replacing discs, and returning the straps to the inward disc-locking positions, further comprising holding the straps in the inward locking position with ribs on movable portions of the case.

34. A method of handling discs, comprising opening a disc-holding case, moving flexible straps from an inward disc-locking position to an outward disc-releasing position, removing discs, replacing discs, and returning the straps to the inward disc-locking positions, wherein the returning the straps comprises engaging end portions of lower surfaces of the straps with peripheral edges of an upper disc and spacing a majority central portion of the lower surface from an upper surface of the uppermost disc.

* * * * *